C. Batcheller.
Motive Power.
N° 106,537. Patented Aug. 23. 1870.
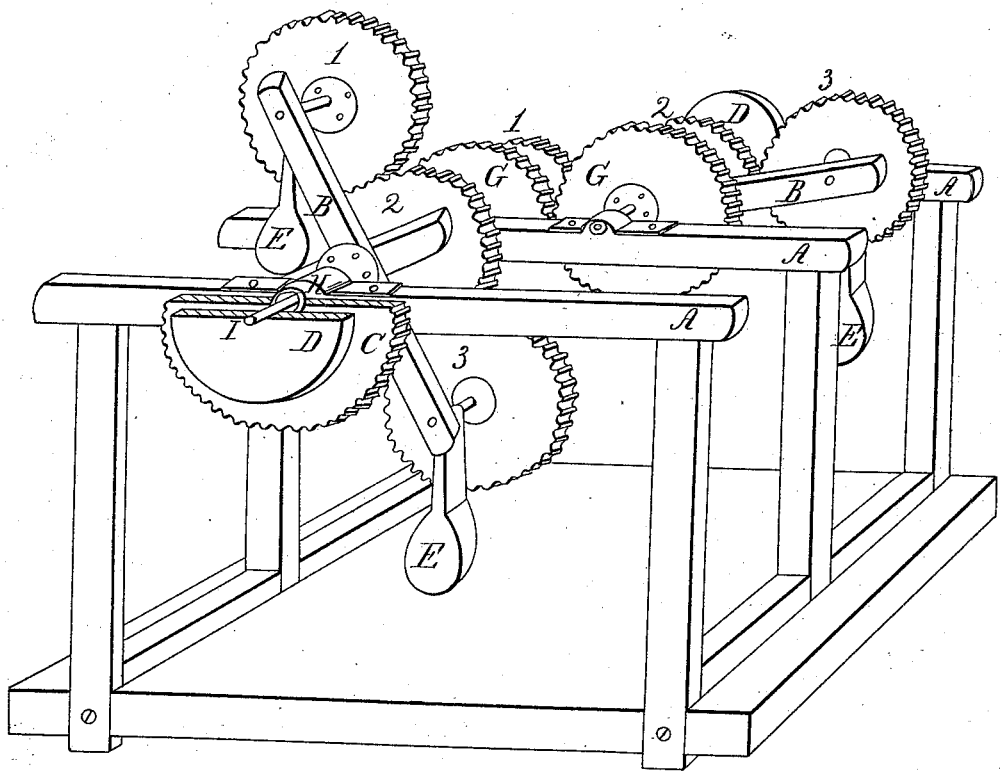
Witnesses
Inventor
Charles Batcheller
Attorney,
Thomas G. Orwig

United States Patent Office.

CHARLES BATCHELLER, OF POLK COUNTY, IOWA.

Letters Patent No. 106,537, dated August 23, 1870.

IMPROVEMENT IN MOTIVE POWER.

The Schedule referred to in these Letters Patent and making part of the same.

I, CHARLES BATCHELLER, in the county of Polk and State of Iowa, have invented a Compound Balance-lever Power, of which the following is a specification.

My invention is designed to provide a simple balance power, that may be advantageously used in connection with any machinery where a balance-wheel or fly-wheel is used, or may be used. By my combination of levers, weights, and gearing, I create a compound power that is perfectly balanced when at rest. Thus far it is similar to a common fly-wheel. But less force is required to put my compound wheel in motion, and, after being started, it accumulates a greater power, and much more rapidly, than an ordinary balance-wheel. The degree of power actually gained has not been accurately determined. In addition to the increase of power, I gain an increase of speed. While my compound balance-lever power makes one revolution, the inside shafts and wheels thereto attached make two revolutions.

The drawing is a perspective view of my compound balance-lever mounted on a frame.

A A A is that frame.

B is one of the pieces forming a frame, in which are hung the geared wheels 1 2 3. There are two of those frames. and two sets of those geared wheels 1 2 3.

C is a geared wheel, which can be used for communicating power.

D is a belt-wheel, which is also used to communicate power. Two of those can be used at the same time, one on each side; and in place of belt-wheels and belting, geared wheels may be substituted.

E is a weighted lever, firmly secured to the axis of the geared wheels 1 and 3. There are four of those weighted levers, but only three shown in the drawing.

G is a geared wheel, secured on the hollow shaft H, together with the frame B. There are two of the geared wheels G, and they are so placed that they connect the two sets of wheels and weights. By this connection the balancing power is formed.

H is the hollow shaft, upon which the frame B and the wheel G are secured, so that they cannot move independent of each other.

I is a shaft, within the hollow shaft H, upon which the communicating wheel D and the center wheel 2 are secured, so that they can move independent of the frame B and wheel G. While the frame B makes one revolution, the wheels D and 2 make two revolutions. This is caused by the action of the weighted levers E. Their weight, or inertia, prevents them from passing around the center of the axis of the wheels with which they are suspended in the revolving frames. The full force of this resistance, or inertia, is applied to the wheels 1 and 3, and, by these wheels, communicated to the center wheel 2.

The size and weight of my compound balance-lever power may be varied and adapted to the various uses to which it may be applied.

Claim.

I claim as my invention—

The construction of a compound balance-lever power, in the manner described, and for the purposes set forth.

Witnesses:      CHARLES BATCHELLER.
    LEWIS J. BROWN,
    A. W. C. WEEKS.